(12) United States Patent
Fujita

(10) Patent No.: US 10,703,275 B2
(45) Date of Patent: Jul. 7, 2020

(54) IMAGE GENERATION APPARATUS

(71) Applicant: FUJITSU TEN LIMITED, Kobe-shi, Hyogo (JP)

(72) Inventor: Atsushi Fujita, Kobe (JP)

(73) Assignee: DENSO TEN Limited, Kobe (JP)

( * ) Notice: Subject to any disclaimer, the term of this patent is extended or adjusted under 35 U.S.C. 154(b) by 198 days.

(21) Appl. No.: 15/492,313

(22) Filed: Apr. 20, 2017

(65) Prior Publication Data
US 2017/0334356 A1 Nov. 23, 2017

(30) Foreign Application Priority Data
May 18, 2016 (JP) .................. 2016-099603

(51) Int. Cl.
| | |
|---|---|
| *B60R 1/00* | (2006.01) |
| *G06T 15/20* | (2011.01) |
| *G06K 9/00* | (2006.01) |
| *G08G 1/16* | (2006.01) |

(Continued)

(52) U.S. Cl.
CPC .............. *B60R 1/002* (2013.01); *B60R 1/00* (2013.01); *G06K 9/00* (2013.01); *G06K 9/00597* (2013.01); *G06K 9/00791* (2013.01); *G06K 9/00805* (2013.01); *G06T 11/60* (2013.01); *G06T 15/205* (2013.01); *G08G 1/166* (2013.01); *G08G 1/167* (2013.01); *H04N 7/181* (2013.01); *B60R 2300/20* (2013.01); *B60R 2300/303* (2013.01); *B60R 2300/60* (2013.01); *B60R 2300/802* (2013.01); *B60R 2300/8033* (2013.01); *B60R 2300/8053* (2013.01); *B60R 2300/8086* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 7,161,616 B1 * | 1/2007 | Okamoto | B60R 1/00 348/148 |
| 7,432,799 B2 * | 10/2008 | Tsuboi | B60Q 9/005 340/425.5 |

(Continued)

FOREIGN PATENT DOCUMENTS

| | | |
|---|---|---|
| JP | 2003-244688 A | 8/2003 |
| JP | 2005-242606 A | 9/2005 |

(Continued)

*Primary Examiner* — Ricky Chin
(74) *Attorney, Agent, or Firm* — Oliff PLC

(57) ABSTRACT

An image generation apparatus includes an image processor and a detector. The image processor generates a composite image viewed from at least one virtual viewpoint, and outputs the generated composite image to a display. The detector detects an indication of a driver intention to drive the host vehicle to a right or to a left relative to a travelling direction of the host vehicle. The image processor generates the composite image viewed from a virtual viewpoint located in front of the host vehicle in the travelling direction, the composite image showing a lateral surface of the host vehicle on a side corresponding to the detected indication of the driver intention. Thus, it is possible to make it easier to check a situation at a time of a right turn, a left turn, or a travelling direction change.

20 Claims, 15 Drawing Sheets

(51) Int. Cl.
*G06T 11/60* (2006.01)
*H04N 7/18* (2006.01)

(56) References Cited

U.S. PATENT DOCUMENTS

| | | | | |
|---|---|---|---|---|
| 2006/0119472 A1* | 6/2006 | Tsuboi | ............... | B60Q 9/005 340/435 |
| 2007/0057816 A1* | 3/2007 | Sakakibara | ......... | B62D 15/027 340/932.2 |
| 2009/0079828 A1* | 3/2009 | Lee | ............... | B60R 1/00 348/148 |
| 2010/0245577 A1* | 9/2010 | Yamamoto | ............ | B60R 1/00 348/148 |
| 2011/0025848 A1* | 2/2011 | Yumiba | ............ | B60R 1/00 348/148 |
| 2012/0154591 A1* | 6/2012 | Baur | ............... | B60R 1/00 348/148 |
| 2012/0170812 A1* | 7/2012 | Kamiyama | ......... | B60R 1/00 382/103 |
| 2013/0083197 A1* | 4/2013 | Yamakage | ......... | G07C 5/0891 348/148 |
| 2013/0231863 A1* | 9/2013 | Okamoto | ............ | B60R 1/00 701/533 |
| 2014/0036063 A1* | 2/2014 | Kim | ............... | H04N 7/18 348/118 |
| 2014/0152774 A1* | 6/2014 | Wakabayashi | ........ | G08G 1/168 348/46 |
| 2014/0354798 A1* | 12/2014 | Galarraga | ......... | H04N 7/183 348/113 |
| 2015/0130640 A1* | 5/2015 | Ryu | ............... | G06K 9/00812 340/932.2 |
| 2015/0175071 A1* | 6/2015 | Ishimoto | ............ | E02F 9/262 348/148 |
| 2015/0232030 A1* | 8/2015 | Bongwald | ............ | B60R 1/00 348/115 |
| 2015/0248131 A1* | 9/2015 | Fairfield | ............ | G05D 1/0044 701/2 |
| 2015/0274179 A1* | 10/2015 | Inoue | ............... | B60W 50/087 701/70 |
| 2016/0176343 A1* | 6/2016 | Sakano | ............... | G06T 7/80 348/148 |
| 2017/0096106 A1* | 4/2017 | Higuchi | ............ | H04N 5/23293 |
| 2017/0282796 A1* | 10/2017 | Kosaki | ............... | B60R 1/00 |
| 2018/0229656 A1* | 8/2018 | Yokota | ............... | B60R 1/00 |
| 2018/0281681 A1* | 10/2018 | Sunohara | ............ | G06T 1/0007 |
| 2018/0319438 A1* | 11/2018 | Herzog | ............... | B60R 11/04 |

FOREIGN PATENT DOCUMENTS

| | | | | |
|---|---|---|---|---|
| JP | 2009118415 A | * | 5/2009 | ............ B60Q 9/005 |
| JP | 2010-274813 A | | 12/2010 | |
| JP | 2010-274814 A | | 12/2010 | |
| JP | 2011-004201 A | | 1/2011 | |
| JP | 2011-030078 A | | 2/2011 | |
| JP | 2011-035816 A | | 2/2011 | |
| JP | 2011-065520 A | | 3/2011 | |
| JP | 2012-253428 A | | 12/2012 | |
| JP | 2013-225903 A | | 10/2013 | |
| JP | 2014-072604 A | | 4/2014 | |

* cited by examiner

| TRAVELLING DIRECTION | DIRECTION TO BE CHANGED RELATIVE TO TRAVELLING DIRECTION | VIRTUAL VIEWPOINT REGION | GAZE REGION |
|---|---|---|---|
| FORWARD DIRECTION | LEFT | FL | SL |
| | RIGHT | FR | SR |
| BACKWARD DIRECTION | RIGHT | BR | SL |
| | LEFT | BL | SR |

FIG. 4B

| INDICATION OF DRIVER INTENTION | LOCATION OF VIRTUAL VIEWPOINT | LOCATION OF GAZE OBJECT | WITH/WITHOUT MIRROR IMAGE OUTPUT | ... |
|---|---|---|---|---|
| LEFT TURN | FL1 | SL1 | WITH | ... |
| RIGHT TURN | FR1 | SR1 | WITHOUT | ... |
| TRAVELLING DIRECTION CHANGE TO LEFT | FL2 | SL2 | WITH | ... |
| TRAVELLING DIRECTION CHANGE TO RIGHT | FR2 | SR2 | WITHOUT | ... |
| ... | ... | ... | ... | ... |

FIG. 8

IMAGE GENERATION APPARATUS

BACKGROUND OF THE INVENTION

Field of the Invention

The invention relates to an image generation apparatus that generates a composite image viewed from an arbitrary virtual viewpoint.

Description of the Background Art

An apparatus that combines camera images captured by a plurality of image capturing apparatus mounted on a vehicle to generate a composite image showing surroundings of the vehicle viewed from an arbitrary virtual viewpoint, such as a viewpoint from directly above the vehicle or a viewpoint located behind the vehicle, and then outputs the generated composite image to a display, has been conventionally proposed.

For example, in a case where a direction indicator switch is operated, an image generation apparatus generates the composite image that is viewed from a viewpoint located behind the vehicle and that shows a lateral region of the vehicle instructed with the direction indicator switch. Such an image generation apparatus has been well known. According to this image generation apparatus, the composite image captured in a same direction as a gaze of a driver can be displayed on the display.

However, as for the foregoing conventional technology, there is a room for a further improvement for driver to easily check a situation to turn right or left, or to change a travelling direction of the vehicle.

For example, there are many cases in which a vehicle and the like approaches the host vehicle from behind a host vehicle and thus the vehicle and the like may come in contact with the host vehicle when the driver of the host vehicle turns right or left, or changes the travelling direction. Therefore, it is difficult to recognize the vehicle and the like approaching from the rear side of the host vehicle based on the composite image showing the lateral region of the host vehicle viewed from the viewpoint located behind the host vehicle as generated by the conventional technology. Thus, there is a possibility that the driver may not recognize in time the vehicle and the like approaching from the rear side of the host vehicle.

SUMMARY OF THE INVENTION

According to one aspect of the invention, an image generation apparatus includes an image processor and a detector. The image processor generates a composite image viewed from at least one virtual viewpoint, based on captured images captured by a plurality of image capturing apparatus mounted on a host vehicle, and outputs the generated composite image to a display. The detector detects an indication of a driver intention to drive the host vehicle to a right or to a left relative to a travelling direction of the host vehicle, based on a drive operation with the host vehicle. In a case where the indication of the driver intention has been detected by the detector, the image processor generates the composite image viewed from a virtual viewpoint located in front of the host vehicle in the travelling direction, the composite image showing a lateral surface of the host vehicle on a side corresponding to the detected indication of the driver intention.

Thus, it is possible to make it easier to check a situation at a time of a right turn, a left turn, or a travelling direction change.

According to another aspect of the invention, the image processor generates the composite image viewed from an external virtual viewpoint located in front of the host vehicle in the travelling direction, the composite image showing the lateral surface of the host vehicle on the side corresponding to the detected indication of the driver intention.

Thus, it is possible to provide, to a driver, the composite image with which the driver easily recognizes a positional relationship between the lateral surface of the host vehicle and an obstacle.

Therefore, an object of the invention to provide a technology to make it easier to check a situation at a time of a right turn, a left turn, or a travelling direction change.

These and other objects, features, aspects and advantages of the invention will become more apparent from the following detailed description of the invention when taken in conjunction with the accompanying drawings.

BRIEF DESCRIPTION OF THE DRAWINGS

FIG. 4B illustrates combinations of the virtual viewpoint regions and the gaze regions corresponding to individual indications of a driver intention;

FIG. 8 illustrates an example of set information;

DESCRIPTION OF THE EMBODIMENTS

With reference to the attached drawings, an image generation apparatus of this embodiment will be described in detail. The invention will not be limited by the embodiment.

Figure 1A:
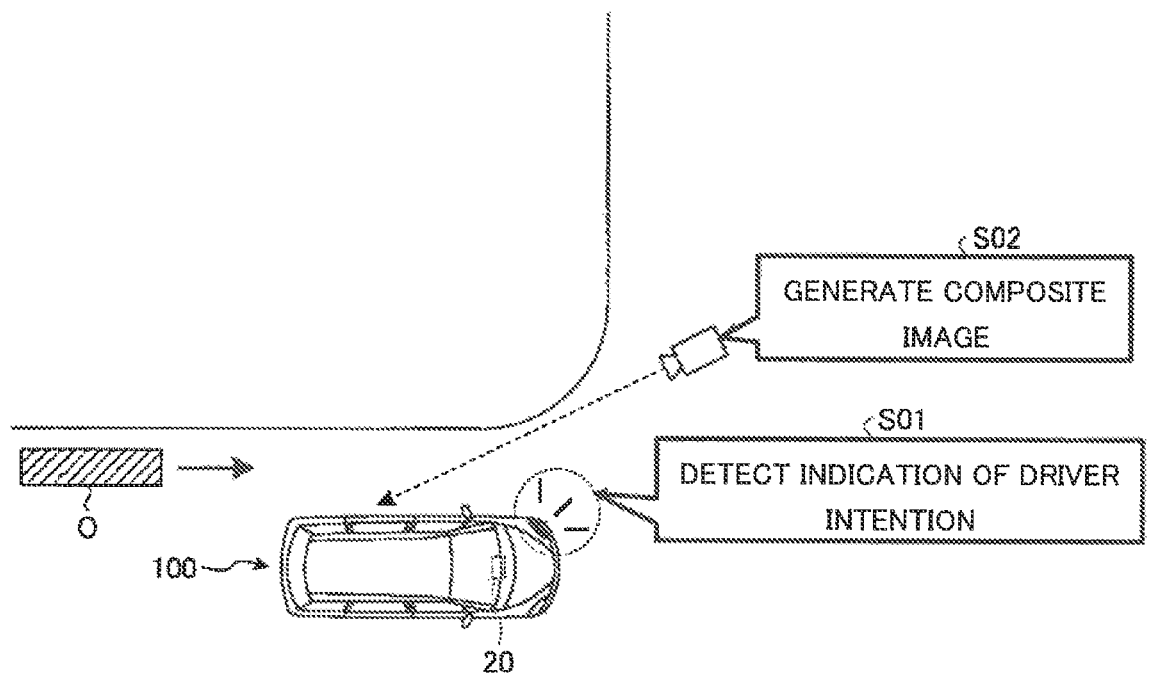
FIG. 1A illustrates an image display method of an embodiment.
Figure 1B:
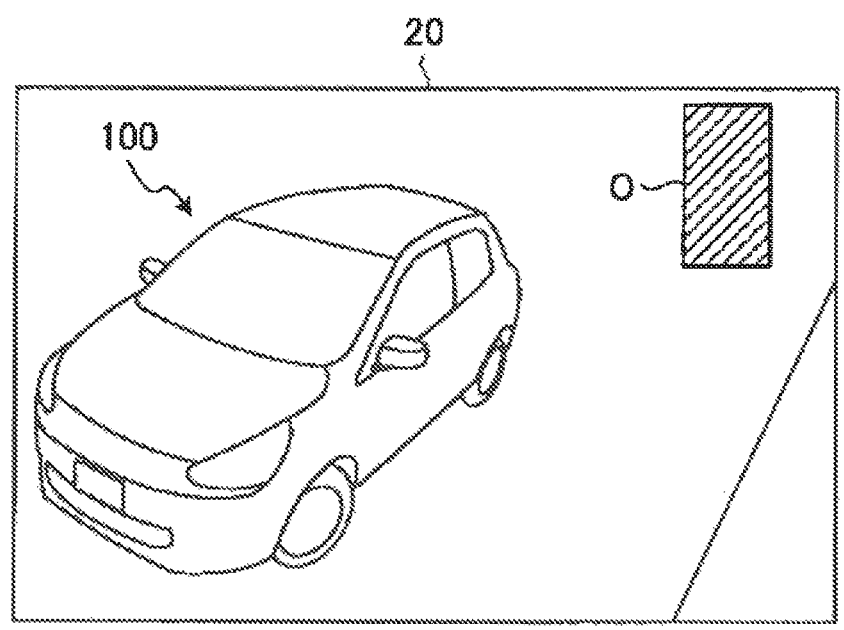
FIG. 1B illustrates an example of a composite image to be displayed on a display.

An outline of an image display method of this embodiment will be described with reference to FIG. 1A and FIG. 1B. FIG. 1A illustrates the image display method of the embodiment. FIG. 1B illustrates an example of a composite image to be displayed on a display. FIG. 1A illustrates a situation in which a driver of a host vehicle is going to turn left.

The image display method of the embodiment detects an indication of a driver intention to drive a host vehicle 100 to a right or a left relative to a travelling direction of the host vehicle 100, such as a right turn, a left turn and a travelling direction change (a step S01).

The indication of the driver intention can be detected based on an operation for drive made with a direction indicator switch, a steering wheel, etc. In other words, for example, in a case where the driver makes an operation to blink a left direction indicator or where the driver turns the steering wheel to the left by a predetermined angle or greater, the indication of the driver intention to drive the host vehicle 100 to the left relative to the travelling direction is detected. Similarly, in a case where the driver makes an operation to blink a right direction indicator or where the driver turns the steering wheel to the right by the predetermined angle or greater, the indication of the driver intention to drive the host vehicle 100 to the right relative to the travelling direction is detected.

In a case where the image display method of the embodiment is used, once the indication of the driver intention is detected, the composite image viewed from a virtual viewpoint is generated based on captured images captured by a plurality of image capturing apparatus (not illustrated) provided on the host vehicle 100 (a step S02). More specifically, the composite image is generated that shows the lateral surface of the host vehicle 100 on a side corresponding to the detected indication of the driver intention and that is viewed from a viewpoint located in front of the host vehicle 100 in the travelling direction.

For example, in the case where the image display method of the embodiment is used, once the indication of the driver intention to drive the host vehicle 100 to the left relative to the travelling direction (in a case of a vehicle in FIG. 1A, the indication of the driver intention to turn left) is detected, the composite image is generated that is viewed from the viewpoint located in front of the host vehicle 100 and that shows a left lateral surface of the host vehicle 100 (a right lateral surface of the host vehicle 100 when being viewed from the viewpoint located in front of the host vehicle 100), and the generated composite image is output to a display 20. Thus, the composite image as shown in FIG. 1B is displayed on the display 20.

As described above, by the image display method of the embodiment, the composite image is generated that shows a lateral surface of the host vehicle 100 viewed from the virtual viewpoint located in front of the host vehicle 100 in the travelling direction, and is displayed on the display 20.

Thus, in the case where the image display method of the embodiment is used, it is possible for the driver to recognize an obstacle O approaching from a rear side of the host vehicle 100 earlier as compared to the conventional technology that generates the composite image showing a lateral region of the vehicle viewed from a viewpoint located behind the vehicle.

Moreover, in the case where the image display method of the embodiment is used, the composite image is generated that shows the lateral surface of the host vehicle 100 on the side corresponding to the indication of the driver intention, for example, the left lateral surface of the host vehicle 100 in a case of a left turn, and the right lateral surface of the host vehicle 100 in a case of a right turn. Thus, the image display method surely displays, in the composite image, the lateral surface of the host vehicle 100 that has a higher possibility of coming in contact with the obstacle O.

Therefore, in the case where the image display method of the embodiment is used, it is possible to make it easier to check a situation at a time of the right turn, the left turn, or the travelling direction change.

FIGS. 1A and 1B illustrate a case in which the composite image showing the lateral surface of the host vehicle 100 viewed from the viewpoint located outside the host vehicle 100 is generated. However, the composite image is not limited to that, but the composite image showing the lateral surface of the host vehicle 100 viewed from a viewpoint located inside the host vehicle 100 may be generated. This point will be described later.

Figure 2:
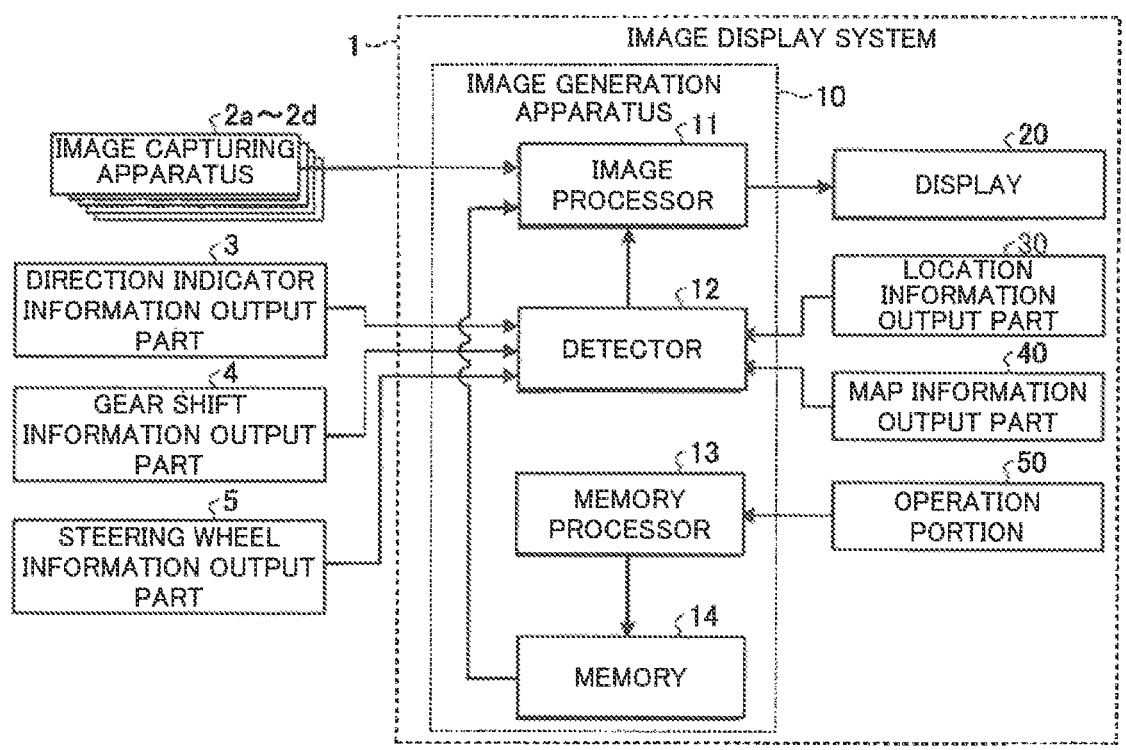
FIG. 2 illustrates an example of a configuration of an image display system of the embodiment.
Figure 3:
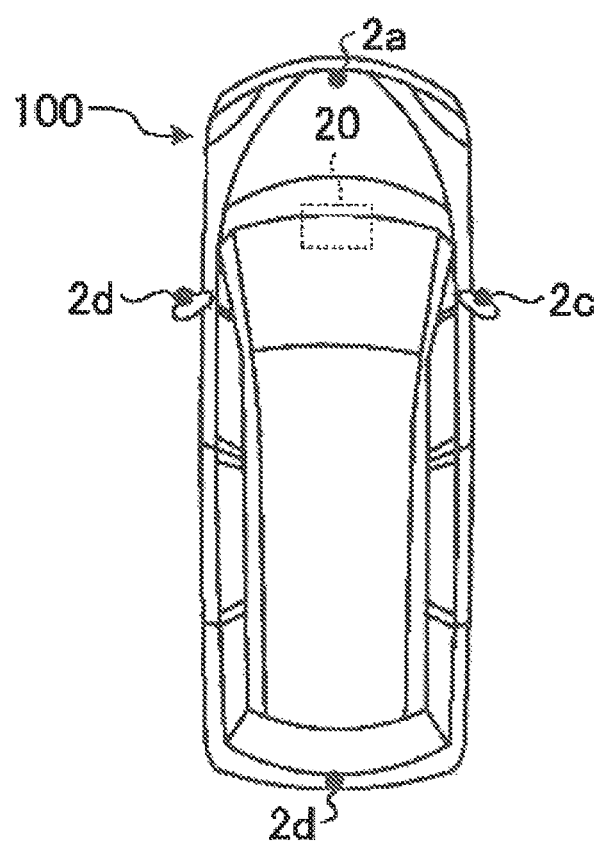
FIG. 3 illustrates an example of a placement of a plurality of image capturing apparatus.

Next, an example of a configuration of an image display system of the embodiment will be described with reference to FIGS. 2 and 3. FIG. 2 illustrates an example of the configuration of the image display system of this embodiment. Moreover, FIG. 3 illustrates an example of a placement of the plurality of image capturing apparatus.

As shown in FIG. 2, an image display system 1 of this embodiment includes an image generation apparatus 10, the display 20, a location information output part 30, a map information output part 40 and an operation portion 50.

The image generation apparatus 10 is, for example, an electronic control unit (ECU), and is configured to send and receive information to/from another ECU, such as a direction indicator information output part 3, a gear shift information output part 4 and a steering wheel information output part 5. The communication between those ECUs is established via an in-vehicle local area network (LAN), such as a controller area network (CAN) bus.

The display 20, the location information output part 30, the map information output part 40 and the operation portion 50 are provided, for example, to a car navigation apparatus. The image display system 1 may be an integrated vehicle-mounted apparatus unit including the image generation apparatus 10 and the display 20.

The image generation apparatus 10 includes an image processor 11, a detector 12, a memory processor 13 and a memory 14.

The image processor 11 generates the composite image viewed from the virtual viewpoint based on the captured images captured by a plurality of image capturing apparatus 2a to 2d provided to the host vehicle 100, and outputs the generated composite image to the display 20.

As shown in FIG. 3, each of the plurality of image capturing apparatus 2a to 2d is provided to a front portion, a rear portion, a right portion and a left portion of the host vehicle 100.

Each of the plurality of image capturing apparatus 2a to 2d includes an image sensor, for example, a charge coupled device (CDD) and a complementary metal oxide semiconductor (CMOS), and captures the images of surroundings of the host vehicle 100, using the image sensor. More specifically, the image capturing apparatus 2a captures an image of an area in front of the host vehicle 100. The image capturing apparatus 2b captures an image of an area behind the host vehicle 100. The image capturing apparatus 2c captures an image of an area on a right side of the host vehicle 100. The image capturing apparatus 2d captures the image of an area on the left side of the host vehicle 100.

Each of the plurality of image capturing apparatus 2a to 2d includes a wide lens, such as a fisheye lens, and has a view angle of 180 degrees or more. Therefore, 360-degree surroundings around the host vehicle 100 can be captured by the plurality of image capturing apparatus 2a to 2d.

The image processor 11 obtains the captured images captured by the plurality of image capturing apparatus 2a to 2d via an output line, such as a national television system committee (NTSC) cable. Moreover, the image processor 11 generates the composite image showing the surroundings of the host vehicle 100 viewed from an arbitrary virtual viewpoint through a coordinate conversion process of the obtained captured images.

In the coordinate conversion process, the image processor 11, for example, projects the captured images onto a predetermined projection surface (data mapping), and generates, as the composite image, an image showing a region viewed from the arbitrary viewpoint at a predetermined view angle based on an input image projected onto the predetermined projection surface.

For example, the image processor 11 stores a table showing a correspondence relationship between a location of each piece of data included in the input image and each location on the predetermined projection surface. The image processor 11 is configured to project the data included in the input image onto corresponding locations on the predetermined projection surface, looking up the table.

The predetermined projection surface is, for example, substantially hemisphere-shaped (e.g. like a bowl), and a center region of the bowl (e.g. a bottom portion of the bowl) is defined as a region for the host vehicle 100. A region located outside the center region for the host vehicle 100 (e.g. portions other than the bottom portion) of the bowl corresponds to a surrounding region of the host vehicle 100. The predetermined projection surface may not be a bent surface but may be a plain surface.

Then, the image processor 11 generates the composite image by chroma keying process of combining the generated composite image with a vehicle image of the host vehicle 100 viewed from the virtual viewpoint, and causes the generated composite image to be displayed on the display 20.

The display 20 includes, for example, a liquid crystal display (LCD) to display the composite image obtained from the image processor 11. A touch screen display may be used as the display 20. In this case, the touch screen display is equivalent to, for example, the operation portion 50.

In a case where the indication of the driver intention to drive the host vehicle 100 to the right or to the left relative to the travelling direction of the host vehicle 100 has been detected by the detector 12, the image processor 11 generates the composite image showing the lateral surface of the host vehicle 100 on the side corresponding to the detected indication of the driver intention, viewed from the viewpoint located in front of the host vehicle 100 in the travelling direction.

Figure 4A:
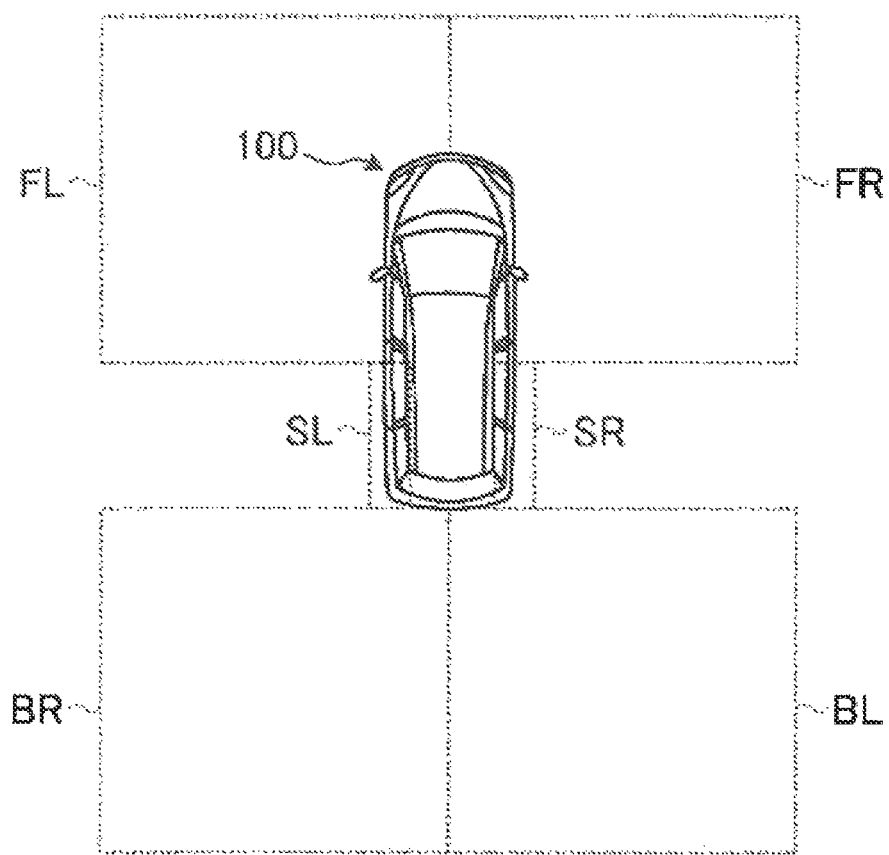
FIG. 4A illustrates virtual viewpoint regions and gaze regions set in a surrounding region of a host vehicle.

This point will be described with reference to FIGS. 4A and 4B. FIG. 4A illustrates virtual viewpoint regions and gaze regions set in the surrounding region of the host vehicle 100. FIG. 4B illustrates combinations of the virtual viewpoint regions and the gaze regions corresponding to the individual indications of the driver intention.

As shown in FIG. 4A, a virtual viewpoint region FL, a virtual viewpoint region FR, a virtual viewpoint region BR and a virtual viewpoint region BL are set beforehand to the surrounding region of the host vehicle 100. For example, the virtual viewpoint regions FL and FR are regions in front of a center of the host vehicle 100, and are located outside the host vehicle 100. Among the virtual viewpoint regions FL and FR, the virtual viewpoint region FL is a region on a left side from the center of the host vehicle 100, and the virtual viewpoint region FR is a region on a right side from the center of the host vehicle 100. Moreover, the virtual viewpoint regions BR and BL are regions behind the host vehicle 100. The virtual viewpoint region BL is a region on the right from the center of the host vehicle 100 (region on the left side when being viewed in a backward travelling direction), and the virtual viewpoint region BR is a region on the left side from the center of the host vehicle 100 (region on the right when being viewed in the backward travelling direction).

Moreover, gaze regions SL an SR are set on left and right lateral surfaces of the host vehicle 100, respectively. The gaze regions SL and SR are, for example, regions rearward from the center of the host vehicle 100 on the lateral surfaces. The gaze region SL is a region on the left side from the center of the host vehicle 100, and the gaze region SR is a region on the right side from the center of the host vehicle 100.

In a case where the travelling direction of the host vehicle 100 is a forward direction, the image processor 11 generates the composite image showing the lateral surface of the host vehicle 100 on the side corresponding to the indication of the driver intention detected by the detector 12, viewed from the viewpoint located in front of the host vehicle 100. In a case where the travelling direction of the host vehicle 100 is a backward direction, the image processor 11 generates the composite image showing the lateral surface of the host vehicle 100 on the side corresponding to the indication of the driver intention detected by the detector 12, viewed from the viewpoint located behind the host vehicle 100. Moreover, in a case where the indication of the driver intention to drive the host vehicle 100 to the left relative to the travelling direction of the host vehicle 100 has been detected by the detector 12, the image processor 11 generates the composite image showing the left lateral surface of the host vehicle 100 viewed from a left external viewpoint located in front of the host vehicle 100 relative to the travelling direction. In a case where the indication of the driver intention to drive the host vehicle 100 to the right relative to the travelling direction has been detected by the detector 12, the image processor 11 generates the composite image showing the right lateral surface of the host vehicle 100 viewed from a right external viewpoint located in front of the host vehicle 100 relative to the travelling direction.

For example, as shown in FIG. 4B, while the travelling direction of the host vehicle 100 is the frontward direction, in the case where the indication of the driver intention to drive the host vehicle 100 to the left relative to the travelling direction has been detected by the detector 12, the image processor 11 generates the composite image showing the gaze region SL viewed from the virtual viewpoint region FL. Moreover, while the travelling direction of the host vehicle 100 is the frontward direction, in the case where the indication of the driver intention to drive the host vehicle 100 to the right has been detected by the detector 12, the image processor 11 generates the composite image showing the gaze region SR viewed from the virtual viewpoint region FR.

While the travelling direction of the host vehicle 100 is the backward direction, in the case where the indication of the driver intention to drive the host vehicle 100 to the right relative to the backward travelling direction has been detected by the detector 12, the image processor 11 generates the composite image showing the gaze region SL viewed from the virtual viewpoint region BR. Moreover, while the travelling direction of the host vehicle 100 is the backward direction, in the case where the indication of the driver intention to drive the host vehicle 100 to the left relative to the backward direction has been detected by the detector 12, the image processor 11 generates the composite image showing the gaze region SR viewed from in the virtual viewpoint region BL.

As described above, the image processor 11 generates the composite image showing the lateral surface of the host vehicle 100 viewed from the viewpoint located in front of the host vehicle 100 in the travelling direction. Thus, as compared to the conventional technology that generates the composite image showing the lateral region of the vehicle viewed from the viewpoint located behind the vehicle, it is possible for the driver to recognize earlier the obstacle O (refer to FIG. 1A) approaching from the rear side of the host vehicle 100.

Moreover, the image processor 11 generates the composite image showing the lateral surface of the host vehicle 100 on the side corresponding to the indication of the driver intention, for example, the left lateral surface in the case of the left turn, and the right lateral surface in the case of the right turn. Thus, it is possible to provide, to the driver, the composite image surely showing the lateral surface of the host vehicle 100 having a higher possibility of coming in a contact with the obstacle O.

Further, the image processor 11 generates the composite image showing the lateral surface of the host vehicle 100 viewed from the external viewpoint located in front of the host vehicle 100 in the travelling direction. Thus, it is possible to provide, to the driver, the composite image with which the driver easily recognizes a positional relationship between the lateral surface of the host vehicle 100 and the obstacle O.

Further, in the case where the indication of the driver intention to drive the host vehicle 100 to the left relative to the travelling direction has been detected, the image processor 11 generates the composite image showing the left lateral surface of the host vehicle 100 viewed from the left external viewpoint located in front of the host vehicle 100 relative to the travelling direction. In the case where the indication of the driver intention to drive the host vehicle 100 to the right relative to the travelling direction has been detected, the image processor 11 generates the composite image showing the right lateral surface of the host vehicle 100 viewed from the right external viewpoint located in front of the host vehicle 100 relative to the travelling direction. Thus, at the time of the right turn, the left turn or the travelling direction change, it is possible to provides, to the driver, the composite image that shows the lateral surface of the host vehicle 100 having a higher possibility of coming in contact with the obstacle O and that is viewed from a viewpoint at an angle closer to a right angle to the lateral surface.

Figure 5A:
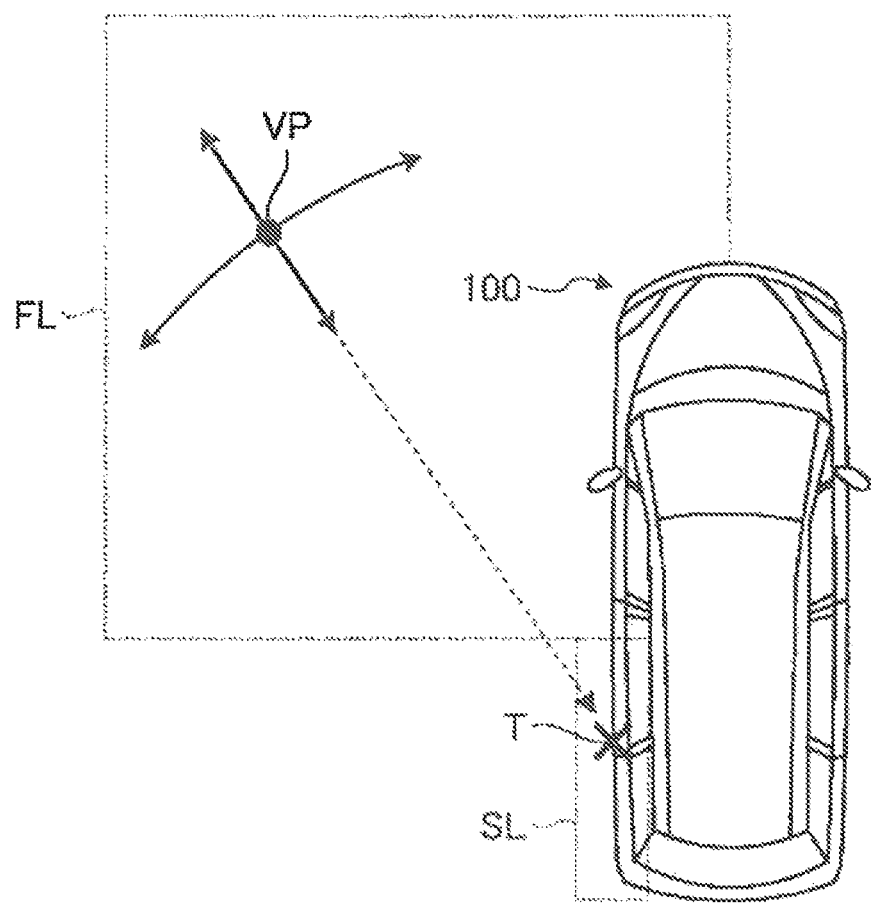
FIG. 5A illustrates an example of a virtual viewpoint set within the virtual viewpoint region and an example of a gaze object set in a gaze region.
Figure 5B:
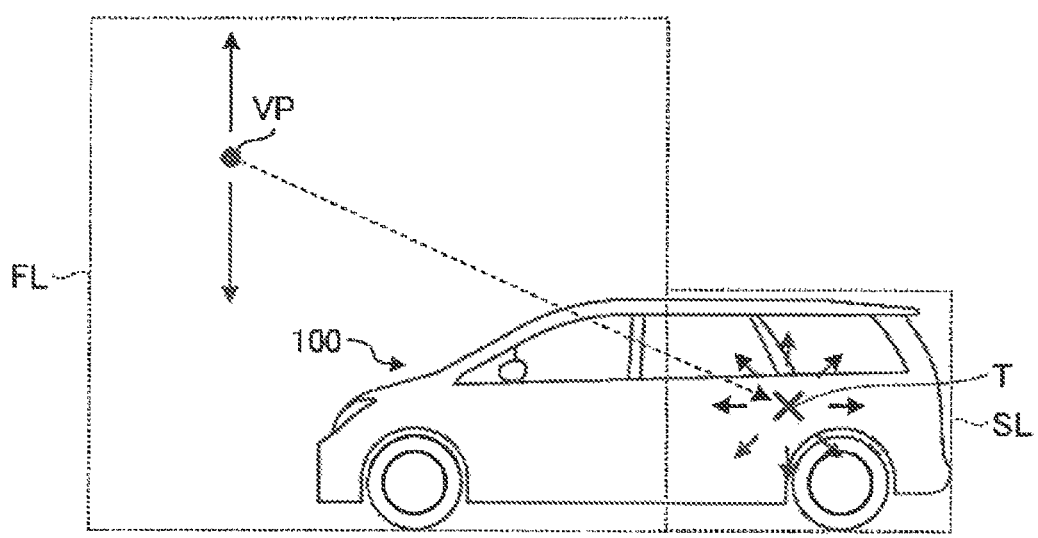
FIG. 5B illustrates an example of a virtual viewpoint set within a virtual viewpoint region and an example of a gaze object set in a gaze region.

FIGS. 5A and 5B illustrates an example of a virtual viewpoint set in the virtual viewpoint region FL and an example of a gaze object set in the gaze region SL. Here, "the virtual viewpoint region FL" is taken as an example of the virtual viewpoint region, and "the gaze region SL" is taken as an example of the gaze region. However, the image generation apparatus 10 works for a different combination of the virtual viewpoint region and the gaze region in a same manner.

As shown in FIGS. 5A and 5B, a location of a virtual viewpoint VP can be arbitrarily set within the virtual viewpoint region FL by a passenger in the host vehicle 100. For example, as shown in FIGS. 5A and 5B, the location of the virtual viewpoint VP is determined by setting: an angle of a line between the virtual viewpoint VP and an gaze object T (i.e. gaze line of the virtual viewpoint VP), relative to the travelling direction of the host vehicle 100; a distance between the gaze object T and the virtual viewpoint VP; a height of the virtual viewpoint VP from a road surface; and the like. As shown in FIG. 5B, a location of the gaze object T can be arbitrarily set within the gaze region SL by a passenger of the host vehicle 100.

The locations of the virtual viewpoint VP and the gaze object T can be set by an operation with, for example, the operation portion 50. Information set is stored in the memory 14 by the memory processor 13, described later. The image processor 11 looks up the set information stored in the memory 14 to determine the locations of the virtual viewpoint VP and the gaze object T.

Figure 6A:
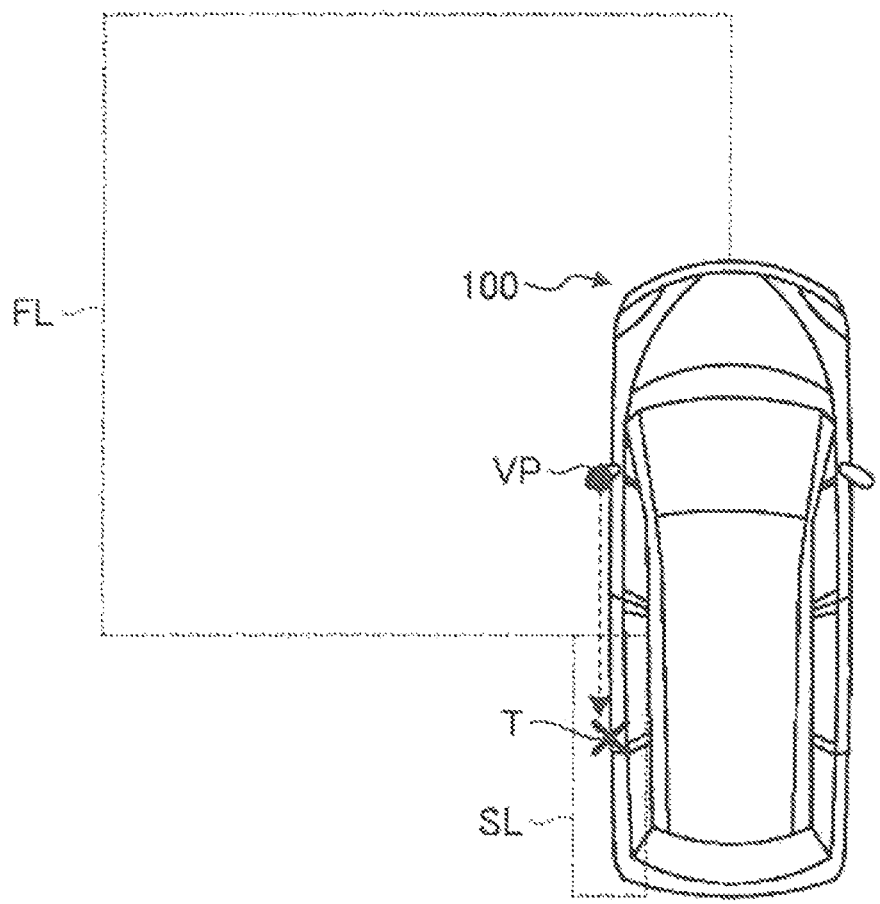
FIG. 6A illustrates a case of generating the composite image showing a lateral surface of the host vehicle viewed from a side mirror.
Figure 6B:
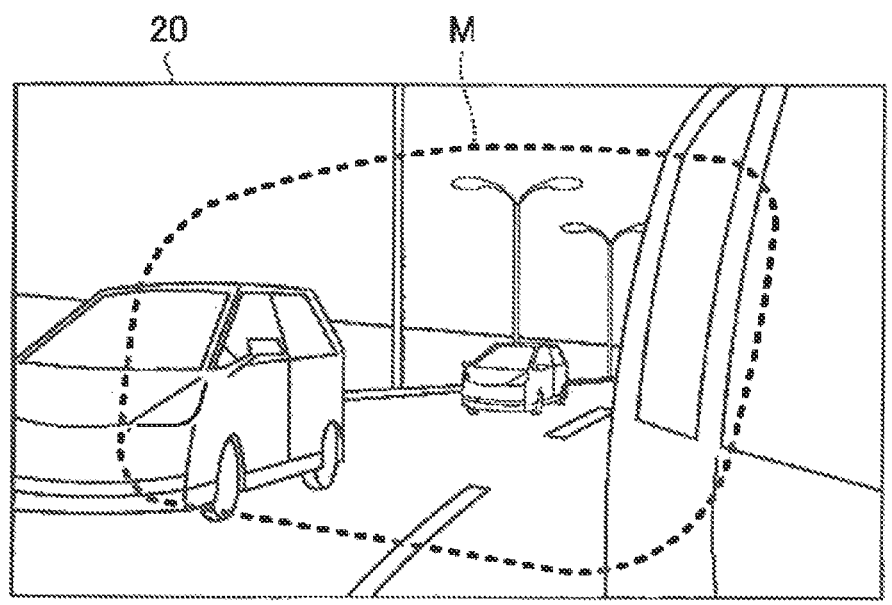
FIG. 6B illustrates a case of generating the composite image showing the lateral surface of the host vehicle viewed from the side mirror.

In the example described above, the location of the virtual viewpoint VP can be arbitrarily set. However, the location of the virtual viewpoint VP may be determined beforehand. This point will be described with reference to FIGS. 6A and 6B. FIGS. 6A and 6B illustrate a case in which the composite image showing the lateral surface of the host vehicle 100 viewed from a side mirror is generated. In FIGS. 6A and 6B, "the virtual viewpoint region FL" is taken as an example of the virtual viewpoint region, and "the gaze region SL" is taken as an example of the gaze region. However, in a case of the virtual viewpoint region "FR" and the gaze region "SR," a process can be performed in a same manner.

As shown in FIG. 6A, the virtual viewpoint region FL includes the side mirror of the host vehicle 100. Therefore, the image processor 11 may set a location of the side mirror as the virtual viewpoint VP and generate the composite image showing the gaze object T viewed from the virtual viewpoint VP. More specifically, the image processor 11 generates the composite image showing the lateral surface of the host vehicle 100 viewed from a location determined beforehand as the location of the side mirror provided to the lateral surface of the host vehicle 100 on the side corresponding to the indication of the driver intention detected by the detector 12, and then flips the generated composite image horizontally, and then outputs the horizontally-flipped composite image to the display 20.

Thus, as shown in FIG. 6B, the display 20 displays the composite image showing an area wider than an area M that is actually in the side mirror. Thus, at the time of the left turn or the travelling direction change to the left, the driver of the host vehicle 100 can easily see whether or not there is the obstacle O while looking at the composite image.

Figure 7A:
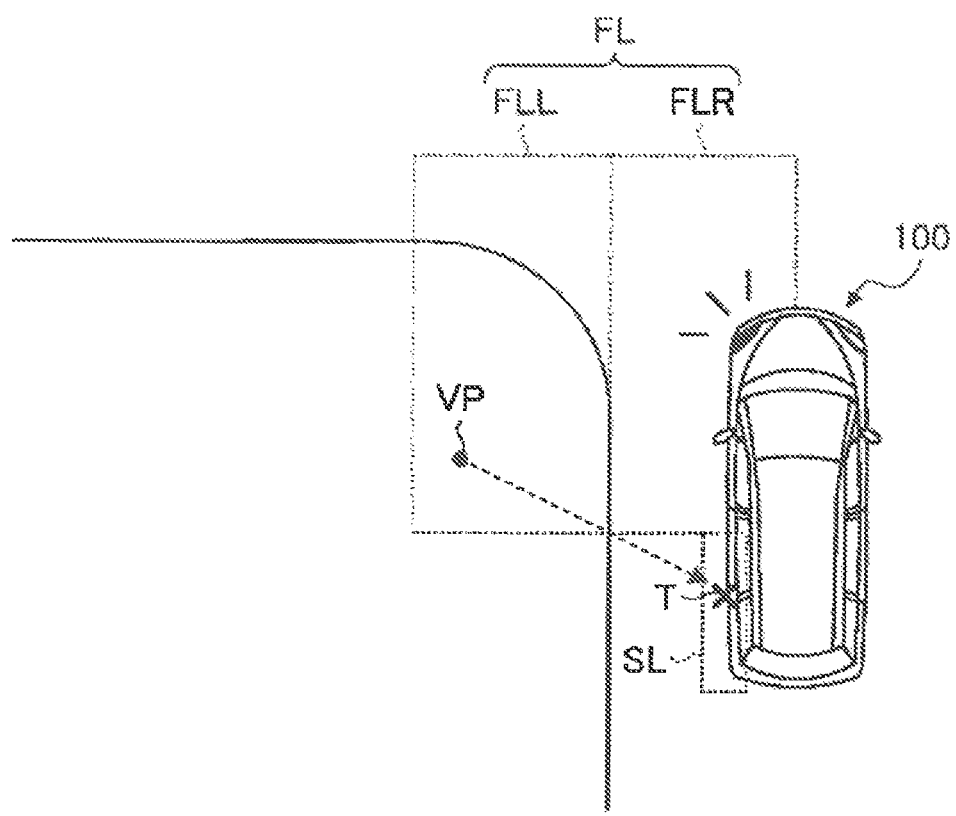
FIG. 7A illustrates locations of the virtual viewpoint and the gaze object to be set in a case where the indication of the driver intention is a left turn.
Figure 7B:
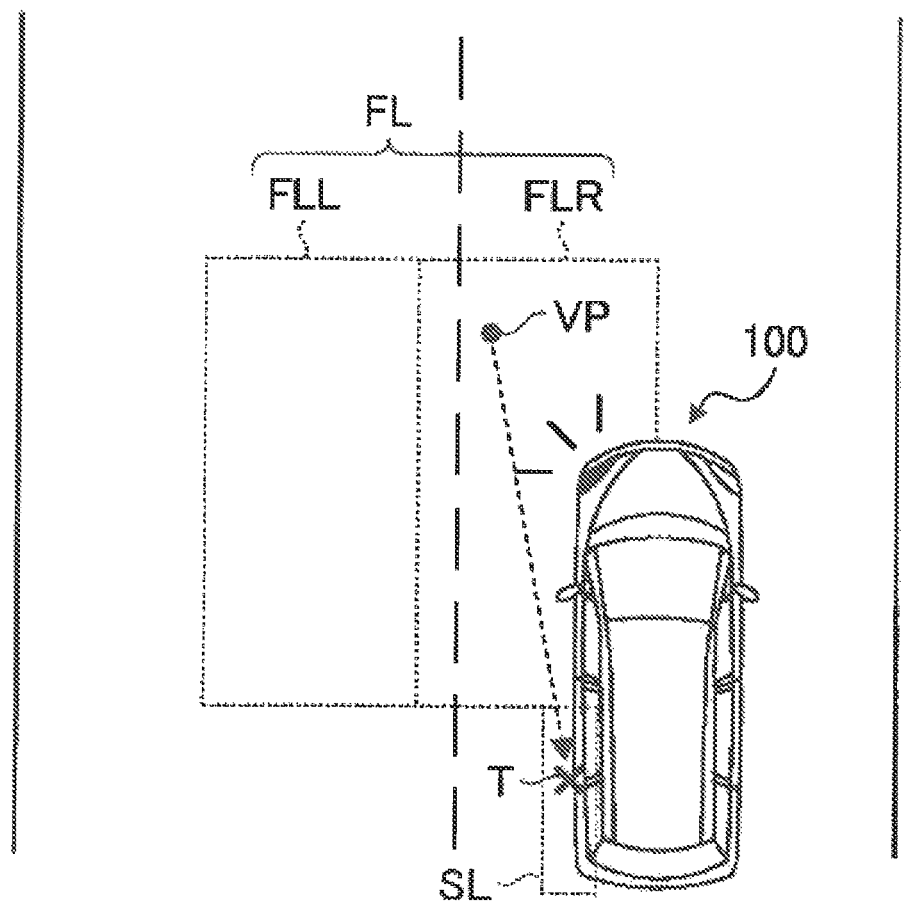
FIG. 7B illustrates the locations of the virtual viewpoint and the gaze object to be set in a case where the indication of the driver intention is a travelling direction change to a left.

However, the image processor 11 may change the location of the virtual viewpoint VP, depending on whether the indication of the driver intention is "the right turn" "the left turn" or "the travelling direction change." This point will be explained with reference to FIGS. 7A and 7B. FIG. 7A illustrates the locations of the virtual viewpoint VP and the gaze object T to be set in the case where the indication of the driver intention is the left turn. FIG. 7B illustrates the locations of the virtual viewpoint VP and the gaze object T to be set in the case where the indication of the driver intention is the travelling direction change to the left. Here, "the virtual viewpoint region FL" is taken as an example of the virtual viewpoint region, and "the gaze region SL" is taken as an example of the gaze region. However, in a case of the virtual viewpoint region "FR" and the gaze region "SR," a process can be performed in a same manner.

As shown in FIG. 7A, the virtual viewpoint region FL is divided, for example, into a left-turn region FLL, a left region, and a travelling-direction change region FLR, a right region. In the case where the indication of the driver intention to turn left has been detected by the detector 12, the image processor 11 generates the composite image showing the gaze region SL viewed from the left-turn region FLL.

On the other hand, as shown in FIG. 7B, in the case where the indication of the driver intention to change the travelling direction of the host vehicle 100 to the left has been detected by the detector 12, the image processor 11 generates the composite image showing the gaze region SL viewed from the travelling-direction change region FLR.

As described above, the image processor 11 may change the virtual viewpoint region between the left-turn region FLL and the travelling-direction change region FLR, depending on whether the indication of the driver intention is the left turn or the travelling direction change.

The left-turn region FLL is provided to a side further from the host vehicle 100 than the travelling-direction change region FLR. Thus, an angle of a gaze viewing the gaze object T from the virtual viewpoint VP within the left-turn region FLL is greater than an angle of a gaze viewing the gaze object T from the virtual viewpoint VP within the travelling-direction change region FLR.

At the time of the left turn, it is recommended to mainly check whether there is no obstacle O on the left lateral surface of the host vehicle 100 to prevent the host vehicle 100 from catching the obstacle O. Thus, it is possible to provide the composite image more appropriate to a check of a situation at the time of the left turn by generating the composite image showing the left lateral surface of the host vehicle 100 viewed from a viewpoint at an angle closer to a right angle to left lateral surface at the time of the left turn.

On the other hand, the travelling-direction change region FLR is provided to a side closer to the host vehicle 100 than the left-turn region FLL. Thus, an angle of the gaze viewing the gaze object T from the virtual viewpoint VP within the travelling-direction change region FLR is smaller than an angle of the gaze viewing the gaze object T from the virtual viewpoint VP within the left-turn region FLL.

At the time of the travelling direction change, it is recommended to mainly check a situation behind the host vehicle 100 to prevent a crash with a following vehicle. Therefore, it is possible to provide the composite image more appropriate to a check of the situation at the time of the travelling direction change by generating the composite image showing a wider region behind the host vehicle 100 at the time of the travelling direction change.

With reference back to FIG. 2, a configuration of the detector 12 will be described. The detector 12 detects the indication of the driver intention to drive the host vehicle 100 to the right or to the left relative to the travelling direction of the host vehicle 100, based on a driving operation with the host vehicle 100.

For example, the detector 12 detects a state of the host vehicle 100 from amongst forward travelling, backward travelling and being parked. Specifically, in a case where the detector 12 obtains, from the gear shift information output part 4, information indicating that a position of the gear shift is in a drive (D), a second (2) or the like, the detector 12 detects that the host vehicle 100 is in the forward travelling state. Moreover, in a case where the detector 12 obtains, from the gear shift information output part 4, information indicating that the position of the gear shift is in reverse (R), the detector 12 detects that the host vehicle 100 is in the backward travelling state. In a case where the detector 12 obtains, from the gear shift information output part 4, information indicating that the position of the gear shift is in a park (P), the detector 12 detects that the host vehicle 100 is in the parked state.

Then, while the host vehicle 100 is in the forward travelling state, once the detector 12 obtains, from the direction indicator information output part 3, information indicating that an operation has been made to blink the left direction indicator (direction indicator on a left side viewed from a driver seat), the detector 12 detects the indication of the driver intention to drive the host vehicle 100 to the left relative to the travelling direction of the host vehicle 100, and then outputs a detection result to the image processor 11. Moreover, while the host vehicle 100 is in the forward travelling state, once the detector 12 obtains, from the direction indicator information output part 3, information indicating that an operation has been made to blink the right direction indicator, the detector 12 detects the indication of the driver intention to drive the host vehicle 100 to the right relative to the travelling direction of the host vehicle 100, and then outputs a detection result to the image processor 11.

Moreover, while the host vehicle 100 is in the backward travelling state, once the detector 12 obtains, from the steering wheel information output part 5, information indicating that an operation has been made to turn the steering wheel to the left by the predetermined angle or greater, the detector 12 detects the indication of the driver intention to drive the host vehicle 100 to the right relative to the backward travelling direction (left viewed from the forward travelling direction) of the host vehicle 100, and then outputs a detection result to the image processor 11. Moreover, while the host vehicle 100 is in the backward travelling state, once the detector 12 obtains, from the steering wheel information output part 5, information indicating that an operation has been made to turn the steering wheel to the right by the predetermined angle or greater, the detector 12 detects the indication of the driver intention to drive the host vehicle 100 to the left relative to the backward travelling direction of the host vehicle 100, and then outputs a detection result to the image processor 11.

The detector 12 further detects, based on the information output from the location information output part 30 and the map information output part 40, whether the indication of the driver intention to drive the host vehicle 100 to the left relative to the forward travelling direction indicates the left turn or the travelling direction change to the left.

For example, using information indicative of a current location of the host vehicle 100 output from the location information output part 30 and map information output from the map information output part 40, the detector 12 recognizes information relating to a road on which the host vehicle 100 is currently travelling, for example, presence or absence of an intersection. Then, once the detector 12 detects, for example, the indication of the driver intention to drive the host vehicle 100 to the left during the forward travelling of the host vehicle 100, the detector 12 determines whether or not there is an intersection ahead of the host vehicle 100 and the host vehicle 100 is within a predetermined range from the intersection. If yes, the detector 12 detects that the indication of the driver intention is "the left turn," and if no, the detector 12 detects that the indication of the driver intention is "the travelling direction change to the left." A process for a case in which the detector 12 detects the indication of the driver intention to drive the host vehicle 100 to the right during the forward travelling of the host vehicle 100 is performed in a same manner.

The memory processor 13 causes the location and the like of the virtual viewpoint VP selected by an operation with the operation portion 50 from amongst a plurality of the virtual viewpoints to be associated with the indication of the driver intention and then to be stored in the memory 14. Here, an example of set information stored in the memory 14 will be described with reference to FIG. 8. FIG. 8 illustrates the example of the set information.

As shown in FIG. 8, the set information includes items, such as "location of the virtual viewpoint," "location of the gaze object," and "with/without mirror image output," associated with the indication of the driver intention. Here, the item "location of the virtual viewpoint" is information indicative of coordinates of the virtual viewpoint VP within the virtual viewpoint regions FL, FR, BL and BR. Moreover, the item "location of the gaze object" is information indicative of coordinates of the gaze object T within the gaze regions SL and SR. Moreover, the item "with/without mirror image output" is information indicative of whether or not the composite image is horizontally flipped and output to the display 20.

The image processor 11 generates, based on the set information stored in the memory 14, the composite image showing the gaze object T associated with the detected indication of the driver intention, viewed from the virtual viewpoint VP stored in association with the detected indication of the driver intention stored in the memory 14.

For example, in the example shown in FIG. 8, for "left turn" as the indication of the driver intention: "a virtual viewpoint region FL1" as "location of the virtual viewpoint;" "a gaze region SL1" as "location of the gaze object;" and "with" as "with/without mirror image output" are set. In this case, the image processor 11 generates the composite image showing the gaze region SL1 having coordinates viewed from coordinates of the virtual viewpoint region FL1, horizontally flips the generated composite image, and then outputs the horizontally-flipped composite image to the display 20. As described above, since the virtual viewpoint can be arbitrarily changed, the driver can arbitrarily select a best location of the virtual viewpoint for the driver.

Figure 9:
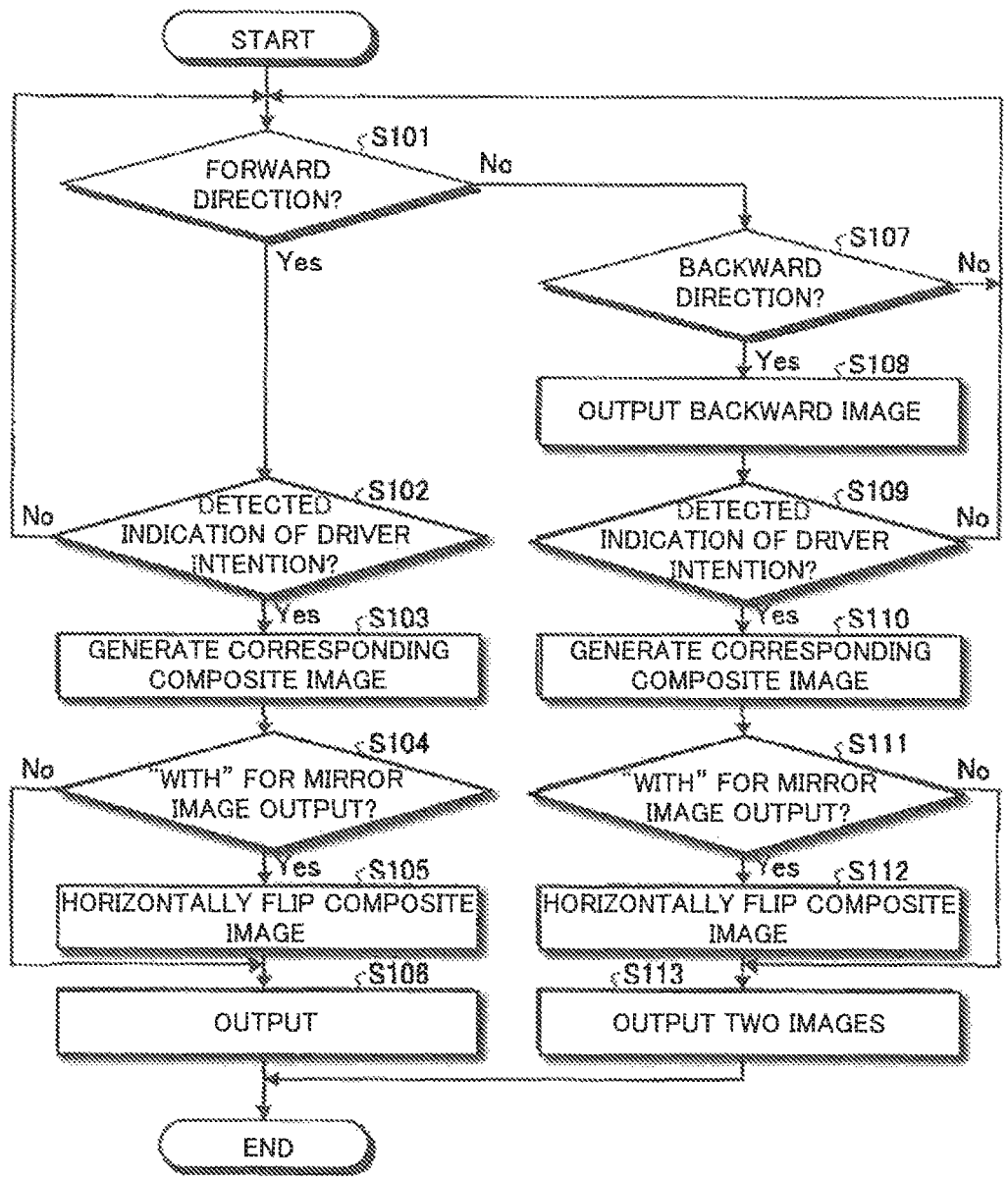
FIG. 9 illustrates a procedure performed by the image generation apparatus.

Next, a concrete operation of the image generation apparatus 10 will be described with reference to FIG. 9. FIG. 9 is a flowchart showing a procedure performed by the image generation apparatus 10. FIG. 9 shows the procedure until the composite image is output to the display 20.

As shown in FIG. 9, the image generation apparatus 10 first determines whether or not the travelling direction of the host vehicle 100 is the forward direction (a step S101). In this step, in a case where the travelling direction of the host vehicle 100 is the forward direction (Yes in the step S101), the image generation apparatus 10 determines whether or not the indication of the driver intention has been detected (a step S102). In this step, in a case where the indication of the driver intention has not been detected (No in the step S102), the image generation apparatus 10 returns the process to the step S101.

In a case where the indication of the driver intention has been detected in the step S102 (Yes in the step S102), the image generation apparatus 10 generates the composite image corresponding to the detected indication of the driver intention (a step S103). In other words, in a case where the indication of the driver intention to drive the host vehicle 100 to the left relative to the travelling direction of the host vehicle 100, such as the left turn and the travelling direction change to the left, has been detected, the image processor 11 generates, based on the set information stored in the memory 14, the composite image showing the gaze region SL viewed from the virtual viewpoint region FL. Moreover, in a case where the indication of the driver intention to drive the host vehicle 100 to the right relative to the travelling direction of the host vehicle 100, such as the right turn and the travelling direction change to the right, has been detected, the image processor 11 generates, based on the set information stored in the memory 14, the composite image showing the gaze region SR viewed from the virtual viewpoint region FR.

In a case where the indication of the driver intention to turn left or to turn right has been detected, the image processor 11 may generate the composite image showing the gaze region SL or the gaze region SR viewed from the left region of the virtual viewpoint region FL (the left-turn region FLL) or the right region of the virtual viewpoint region FR. Moreover, in a case where the indication of the driver intention to change the travelling direction of the host vehicle 100 has been detected, the image processor 11 may generate the composite image showing the gaze region SL or the gaze region SR viewed from the right region of the virtual viewpoint region FL (the travelling-direction change region FLR) or the left region of the virtual viewpoint region FR.

Next, the image generation apparatus 10 determines whether or not "with" is set for the mirror image output (a step S104). In a case where "with" is set (Yes in the step S104), the image generation apparatus 10 horizontally flips the composite image (a step S105) and outputs the horizontally-flipped composite image to the display 20 (a step S106). As described above, it is possible to provide, to the driver, an image similar to an image in the side mirror or a rearview mirror by horizontally flipping the generated composite image and outputting the horizontally-flipped composite image to the display 20. Thus, in a case where the driver checks the situation, looking at the composite image as well as the side mirror and/or the rearview mirror, it is possible to prevent the driver from being confused.

On the other hand, in a case where "with" is not set (No in the step S104), the image generation apparatus 10 outputs the generated composite image without horizontally flipping the composite image (the step S106).

Moreover, in a case where the travelling direction of the host vehicle 100 is not the forward direction in the step S101 (No in the step S101), the image generation apparatus 10 determines whether or not the travelling direction of the host vehicle 100 is the backward direction (a step S107). In this step, in a case where the travelling direction of the host vehicle 100 is the backward direction (Yes in the step S107), the image generation apparatus 10 outputs the captured image (hereinafter referred to as "backward image") captured by image capturing apparatus 2b (refer to FIG. 3), to the display 20 (a step S108).

Next, the image generation apparatus 10 determines whether or not the indication of the driver intention has been detected (a step S109). For example, this step determines whether or not an operation of turning the steering wheel by the predetermined angle or greater, has been detected based on information output from the steering wheel information output part 5. In this step, in the case where the indication of the driver intention has been detected (Yes in the step S109), the image generation apparatus 10 generates the composite image corresponding to the detected indication of the driver intention (a step S110). In other words, in the case where the indication of the driver intention to drive the host vehicle 100 to the left relative to the backward direction has been detected, the image processor 11 generates the composite image showing the gaze region SR viewed from the virtual viewpoint region BL. In the case where the indication of the driver intention to drive the host vehicle 100 to the right relative to the backward direction has been detected, the image processor 11 generates the composite image showing the gaze region SL viewed from the virtual viewpoint region BR. The location of the virtual viewpoint VP within the virtual viewpoint regions BL and BR, and the location of the gaze object T within the gaze regions SL and SR are determined based on the set information stored in the memory 14.

Next, the image generation apparatus 10 determines whether or not "with" is set for the item, mirror image output (a step S111). In a case where "with" is set for the item (Yes in the step S111), the image generation apparatus 10 horizontally flips the composite image (a step S112). Then, the image generation apparatus 10 outputs the composite image generated in the step S112 and the backward image to the display 20. In other words, two images are output (a step S113). As described above, in a case where the host vehicle 100 travels in the backward direction, the composite image is displayed along with the backward image on the display 20. Thus, the driver can check the lateral surface of the host vehicle 100 on the side corresponding to the indication of the driver intention, looking at the composite image, while checking the situation behind the host vehicle 100, looking at the backward image.

On the other hand, in a case where "with" is not set for the mirror image in the step S111 (No in the step S111), the image generation apparatus 10 outputs the composite image generated in the step S110 with the backward image to the display 20 (a step S113).

In a case where the travelling direction of the host vehicle 100 is not the backward direction in the step S107 (No in the step S107), i.e., for example, in a case where the host vehicle 100 is in the parked state, the image generation apparatus 10 returns the process to the step S101. In other words, even in a case where an operation with the direction indicator switch is made in the parked state, the operation with the direction indicator switch is not detected as the indication of the driver intention, and thus the composite image is not generated. Further, also in a case where the indication of the driver intention has not been detected in the step S109 (No in the step S109), the image generation apparatus 10 returns the process to the step S101.

Figure 10:
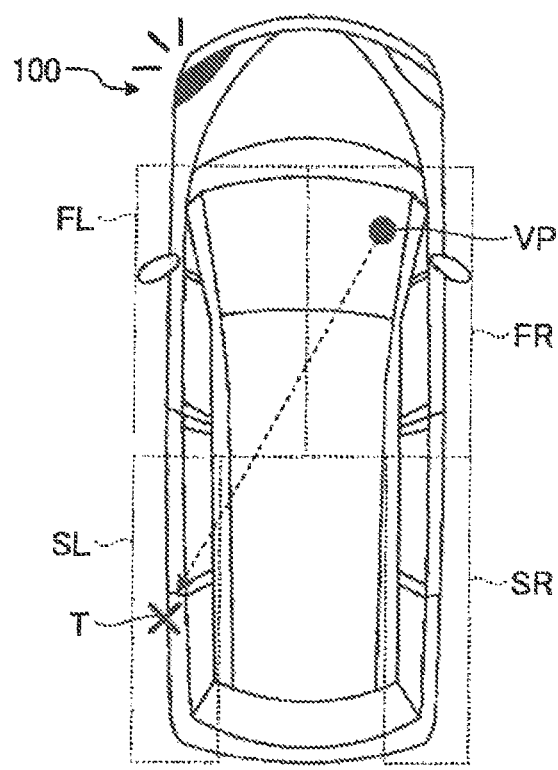
FIG. 10 illustrates a virtual viewpoint region and a gaze region that are set in a surrounding region of a host vehicle in an example of a modification.

The foregoing embodiment describes an example of the case in which the image generation apparatus 10 generates the composite image showing the lateral surface of the host vehicle 100 viewed from the viewpoint located outside the host vehicle 100. However, the invention is not limited to this, and the image generation apparatus 10 may generate the composite image showing the lateral surface of the host vehicle 100 viewed from a viewpoint located inside the host vehicle 100. This point will be described with reference to FIG. 10. FIG. 10 illustrates an example of a modification of the virtual viewpoint region and the gaze region that are set in a surrounding region of a host vehicle 100.

As shown in FIG. 10, in the modification, virtual viewpoint regions FL and FR are set inside the host vehicle 100. Specifically, the virtual viewpoint regions FL and FR are regions in front of a center of the host vehicle 100, and are located inside the host vehicle 100. Among the virtual viewpoint regions FL and FR, the virtual viewpoint region FL is a region on a left side from the center of the host vehicle 100 in a forward travelling direction, and the virtual viewpoint region FR is region on a right side from the center of the host vehicle 100 in the forward travelling direction.

Then, an image processor 11 of the modification generates a composite image that: shows a lateral surface of the host vehicle 100 on a side corresponding to an indication of a driver intention detected by a detector 12; and is viewed from a frontal viewpoint located inside the host vehicle 100 in the travelling direction.

For example, as shown in FIG. 10, in a case where the indication of the driver intention to drive the host vehicle 100 to a left relative to the travelling direction of the host vehicle 100 has been detected by the detector 12, the image processor 11 generates the composite image showing a left lateral surface of the host vehicle 100 viewed from the virtual viewpoint region FR, and outputs the generated composite image to a display 20. Thus, the display 20 displays the composite image showing the lateral surface of the host vehicle 100 through the host vehicle 100 viewed from the viewpoint located inside the host vehicle 100.

As described above, the image processor 11 generates the composite image showing the lateral surface of the host vehicle 100 viewed from the viewpoint located inside the host vehicle 100, more specifically, a driver seat of the host vehicle 100. Thus, it is possible to provide a driver with an image similar to a scene that the driver sees when the driver actually checks a situation to prevent the host vehicle 100 from catching an object.

As described above, the image generation apparatus 10 of the embodiment includes the image processor 11 and the detector 12. The image processor 11 generates, based on the captured images captured by the plurality of image capturing apparatus 2a to 2d mounted on the host vehicle 100, the composite image viewed from the virtual viewpoint VP, and then outputs the generated composite image to the display 20. The detector 12 detects the indication of the driver intention to drive the host vehicle 100 to the right or the left relative to the travelling direction of the host vehicle 100, based on the driving operation with the host vehicle 100. Moreover, in the case where the indication of the driver intention has been detected by the detector 12, the image processor 11 generates the composite image showing the lateral surface of the host vehicle 100 on the side corresponding to the detected indication of the driver intention, viewed from a viewpoint located in front of the host vehicle 100 in the travelling direction.

Thus, according to the image generation apparatus 10 of the embodiment, it is possible to make it easier to check a situation at the time of the right turn, the left turn or the travelling direction change.

In the foregoing embodiment, the indication of the driver intention to turn right, turn left or change the travelling direction is detected based on an operation with the direction indicator switch. However, the indication of the driver intention is not limited to the operation with the direction indicator switch, but turning the steering wheel to the right or the left by the predetermined angle or greater may be detected as the indication of the driver intention to drive the host vehicle 100 to the right or the left relative to the travelling direction.

The foregoing embodiment describes an example of the case in which the operation with the direction indicator switch is detected as the indication of the driver intention to turn right or left if the host vehicle 100 is located near an intersection. The foregoing embodiment describes an example for the case in which the indication of the driver intention is detected as the travelling direction change of the host vehicle 100 if the host vehicle 100 is not located near an intersection. However, the indication of the driver intention is not limited to the examples described above. For example, the detector 12 obtains information of a speed of the host vehicle 100 from a vehicle speed sensor or the like mounted on the host vehicle 100, and when the direction indicator switch is operated, in a case where the vehicle speed of the host vehicle 100 is a predetermined threshold value or greater, the detector 12 may detect the indication of the driver intention to change the travelling direction. In a case where the vehicle speed of the host vehicle 100 is below the predetermined threshold value, the detector 12 may detect the indication of the driver intention to turn right or left.

A plurality of the embodiments of the image generation apparatus are described in detail based on the drawings. The embodiments are only examples, and this invention can be implemented in different embodiments having various modifications and improvements based on the knowledge of a person skilled in the art.

While the invention has been shown and described in detail, the foregoing description is in all aspects illustrative and not restrictive. It is therefore understood that numerous other modifications and variations can be devised without departing from the scope of the invention.

What is claimed is:

1. An image generation apparatus for use with a user in a host vehicle, the image generation apparatus comprising:
    a memory storing a location of at least one virtual viewpoint within a virtual viewpoint region and a location of at least one gaze object within a gaze object region, which are respectively set by an operation of the user in the host vehicle via an input to a navigation or touch screen, the operation including: (a) setting an angle of a line between the at least one virtual viewpoint and the at least one gaze object, (b) setting a distance between the at least one virtual viewpoint and the at least one gaze object, and (c) setting a height of the at least one virtual viewpoint from a road surface;
    an image processor configured to:
        generate a composite image viewed from the location of the at least one virtual viewpoint and oriented towards the location of the at least one gaze object of the host vehicle, based on captured images captured by a plurality of image capturing apparatus mounted on the host vehicle, and
        output the generated composite image to a display; and
    a detector that detects an indication of a driver intention to drive the host vehicle to a right or to a left relative to a travelling direction of the host vehicle, based on a drive operation with the host vehicle, wherein
    in a case where the indication of the driver intention has been detected by the detector, the image processor generates the composite image viewed from a virtual viewpoint located in front of a center of the host vehicle in the travelling direction, the composite image showing a lateral surface of the host vehicle on a side corresponding to the detected indication of the driver intention viewed in a direction having a component that is opposite to the travelling direction.

2. The image generation apparatus according to claim 1, wherein
    the image processor generates the composite image viewed from an external virtual viewpoint located in front of the host vehicle in the travelling direction, the composite image showing the lateral surface of the host vehicle on the side corresponding to the detected indication of the driver intention.

3. The image generation apparatus according to claim 2, wherein
    (i) in a case where the indication of the driver intention to drive the host vehicle to the left relative to the travelling direction has been detected, the image processor generates the composite image showing a left lateral surface of the host vehicle viewed from a left external virtual viewpoint located in front of the host vehicle relative to the travelling direction, and (ii) in a case where the indication of the driver intention to drive the host vehicle to the right relative to the travelling direction has been detected, the image processor generates the composite image showing a right lateral surface of the host vehicle viewed from a right external virtual viewpoint located in front of the host vehicle relative to the travelling direction.

4. The image generation apparatus according to claim 1, wherein
    the image processor generates the composite image showing the lateral surface of the host vehicle viewed from a location determined beforehand as a location of a side mirror provided to the lateral surface of the host vehicle on the side corresponding to the detected indication of the driver intention.

5. The image generation apparatus according to claim 1, wherein
    the image processor generates the composite image viewed from a frontal virtual viewpoint located inside the host vehicle in the travelling direction, the composite image showing the lateral surface of the host vehicle on the side corresponding to the detected indication of the driver intention.

6. The image generation apparatus according to claim 1, wherein
    in a case where the travelling direction of the host vehicle is a backward direction, the image processor generates the composite image viewed from a virtual viewpoint located behind the host vehicle, and outputs the generated composite image to the display along with an image showing an area behind the host vehicle viewed from the host vehicle, the composite image showing the lateral surface of the host vehicle on the side corresponding to the detected indication of the driver intention.

7. The image generation apparatus according to claim 1, wherein
    the image processor horizontally flips the composite image and outputs the horizontally-flipped composite image to the display.

8. The image generation apparatus according to claim 1, further comprising:
    a memory processor that causes: (i) the virtual viewpoint selected from amongst a plurality of the virtual viewpoints to be associated with the indication of the driver intention and (ii) the associated virtual viewpoint to be stored in a memory, wherein
    the image processor generates the composite image viewed from the virtual viewpoint stored in association with the detected indication of the driver intention, the composite image showing the lateral surface of the host vehicle on the side corresponding to the detected indication of the driver intention.

9. The image generation apparatus according to claim 1, wherein
    the at least one viewpoint includes a location of a side mirror of the host vehicle, and
    the at least one gaze object includes a rear side of the host vehicle.

10. An image display system for use with a user in a host vehicle, the image display system comprising:
    a display;

a memory storing a location of at least one virtual viewpoint within a virtual viewpoint region and a location of at least one gaze object within a gaze object region, which are respectively set by an operation of the user in the host vehicle via an input to a navigation or touch screen, the operation including: (a) setting an angle of a line between the at least one virtual viewpoint and the at least one gaze object, (b) setting a distance between the at least one virtual viewpoint and the at least one gaze object, and (c) setting a height of the at least one virtual viewpoint from a road surface; and an image generation apparatus that includes:
(i) an image processor that generates a composite image viewed from the location of the at least one virtual viewpoint and oriented towards the location of the at least one gaze object, based on captured images captured by a plurality of image capturing apparatus mounted on a host vehicle, and that outputs the generated composite image to the display; and
(ii) a detector that detects an indication of a driver intention to drive the host vehicle to a right or to a left relative to a travelling direction of the host vehicle, based on a drive operation with the host vehicle, wherein in a case where the indication of the driver intention has been detected by the detector, the image processor generates the composite image viewed from a virtual viewpoint located in front of a center of the host vehicle in the travelling direction, the composite image showing a lateral surface of the host vehicle on a side corresponding to the detected indication of the driver intention viewed in a direction having a component that is opposite to the travelling direction.

11. The image display system according to claim 10, wherein
the at least one viewpoint includes a location of a side mirror of the host vehicle, and
the at least one gaze object includes a rear side of the host vehicle.

12. An image display method for use with a user in a host vehicle, the method comprising the steps of:
(a) setting, by an operation of the user in the host vehicle via an input to a navigation or touch screen, a location of at least one virtual viewpoint within a virtual viewpoint region and a location of at least one gaze object within a gaze object region, the operation including:
setting an angle of a line between the at least one virtual viewpoint and the at least one gaze object,
setting a distance between the at least one virtual viewpoint and the at least one gaze object, and
setting a height of the at least one virtual viewpoint from a road surface;
(b) generating a composite image viewed from the location of the at least one virtual viewpoint and oriented towards the location of the at least one gaze object, based on captured images captured by a plurality of image capturing apparatus mounted on a host vehicle, and outputting the generated composite image to a display; and
(c) detecting an indication of a driver intention to drive the host vehicle to a right or to a left relative to a travelling direction of the host vehicle, based on a drive operation with the host vehicle, wherein
in a case where the indication of the driver intention has been detected by the step (c), the step (b) generates the composite image viewed from a virtual viewpoint located in front of a center of the host vehicle in the travelling direction, the composite image showing a lateral surface of the host vehicle on a side corresponding to the detected indication of the driver intention viewed in a direction having a component that is opposite to the travelling direction.

13. The image display method according to claim 12, wherein
the step (b) generates the composite image viewed from an external virtual viewpoint located in front of the host vehicle in the travelling direction, the composite image showing the lateral surface of the host vehicle on the side corresponding to the detected indication of the driver intention.

14. The image display method according to claim 13, wherein
(i) in a case where the indication of the driver intention to drive the host vehicle to the left relative to the travelling direction of the host vehicle has been detected, the step (b) generates the composite image showing a left lateral surface of the host vehicle viewed from a left external virtual viewpoint located in front of the host vehicle relative to the travelling direction, and (ii) in a case where the indication of the driver intention to drive the host vehicle to the right relative to the travelling direction has been detected, the step (b) generates the composite image showing a right lateral surface of the host vehicle viewed from a right external virtual viewpoint located in front of the host vehicle relative to the travelling direction.

15. The image display method according to claim 12, wherein
the step (b) generates the composite image showing the lateral surface of the host vehicle viewed from a location determined beforehand as a location of a side mirror provided to the lateral surface of the host vehicle on the side corresponding to the detected indication of the driver intention.

16. The image display method according to claim 12, wherein
the step (b) generates the composite image viewed from a frontal virtual viewpoint located inside the host vehicle in the travelling direction, the composite image showing the lateral surface of the host vehicle on the side corresponding to the detected indication of the driver intention.

17. The image display method according to claim 12, wherein
in a case where the travelling direction of the host vehicle is a backward direction, the step (b) generates the composite image viewed from a virtual viewpoint located behind the host vehicle, and outputs the generated composite image to the display along with an image showing an area behind the host vehicle viewed from the host vehicle, the composite image showing the lateral surface of the host vehicle on the side corresponding to the detected indication of the driver intention.

18. The image display method according to claim 12, wherein
the step (b) horizontally flips the composite image and outputs the horizontally-flipped composite image to the display.

19. The image display method according to claim 12, further comprising the step of:

(c) causing: (i) the virtual viewpoint selected from amongst a plurality of the virtual viewpoints to be associated with the indication of the driver intention and (ii) the associated virtual viewpoint to be stored in a memory, wherein the step (b) generates the composite image viewed from the virtual viewpoint stored in association with the detected indication of the driver intention, the composite image showing the lateral surface of the host vehicle on the side corresponding to the detected indication of the driver intention.

20. The image display method according to claim 12, wherein the at least one viewpoint includes a location of a side mirror of the host vehicle, and the at least one gaze object includes a rear side of the host vehicle.

\* \* \* \* \*